3,501,566
SEX ATTRACTANT OF THE BLACK CARPET BEETLE
Wendell E. Burkholder, Madison, Wis., Robert M. Silverstein and John O. Rodin, Menlo Park, Calif., and John E. Gorman, Madison, Wis., assignors to the United States of America as represented by the Secretary of Agriculture
No Drawing. Filed Dec. 28, 1967, Ser. No. 694,101
Int. Cl. A01n 17/14
U.S. Cl. 424—84                3 Claims

ABSTRACT OF THE DISCLOSURE

The principal sex attractant in female black carpet beetles was isolated and identified as trans-3,cis-5-tetradecadienoic acid. This compound, or various other geometric (cis-trans) isomers thereof, can be employed as an attractant in traps to detect and control infestations of the insects.

---

A non-exclusive, irrevocable, royalty-free license in the invention herein described, throughout the world for all purposes of the United States Government, with the power to grant sub-licenses for such purposes, is hereby granted to the Government of the United States of America.

This invention relates to and has among its objects the provision of certain organic compounds and methods of using them for the purpose of attracting black carpet beetles to detect and control local infestations thereof. Further objects of the invention will be evident from the following description wherein parts and percentages are by weight unless otherwise specified.

Black carpet beetles belong to the species *Attagenus megatoma* (Fabricius)—also known as *Attagenus piceus* (Olivier)—and constitute a serious pest in the storage of grain. Also, as suggested by their name, these insects attack carpets, garments, and other textile products made from wool, mohair, or other proteinous fibers.

In order to effect control or eradication of the black carpet beetle, it is necessary to locate the area and degree of infestation. This may be done by setting out traps in suspected areas and placing inside the traps a substance which acts as a bait or attractant for the beetles.

The compounds of the invention are such attractants. They may be applied with an inert carrier or mixed with a toxic agent which kills all the beetles entering the trap. By counting the number of trapped beetles it is possible to estimate the degree of infestation of a given area. Moreover, traps baited with the compounds of the invention— especially when used in conjunction with a toxicant—may be applied as a means of control in selected areas known to be infested.

The attractants of the invention include the various geometric isomers of 3,5-tetradecadienoic acid, and mixtures thereof. These compounds all respond to the structure—

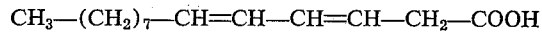

$CH_3-(CH_2)_7-CH=CH-CH=CH-CH_2-COOH$

Because of the presence of the two ethylenic linkages, the compounds are subject to geometric (cis-trans) isomerism and four of such isomers are possible, namely:

trans-3,cis-5-tetradecadienoic acid,
cis-3,trans-5-tetradecadienoic acid,
cis-3,cis-5-tetradecadienoic acid, and
trans-3,trans-5-tradecadienoic acid.

We have found that the trans-3,cis-5 isomer is present in female black carpet beetles and have isolated it therefrom. This isomer and the others may also be synthesized by various standard techniques as illustrated hereinbelow.

It is obvious that for practical use in traps or the like, the synthetic compounds are preferred because they can be more readily prepared than the natural attractant.

The compounds of the invention can be used in actual practice in the field in baited traps either in solution in an inert solvent or as an aqueous emulsion. Alternatively, they may be impregnated in a carrier such as paper, cloth, clay, or other absorbent material. They can also be used in admixture with substances known to be toxic to black carpet beetles, such as parathion, malathion, DDT, lindane, dieldrin, aldrin, and the like. Like other sex attractants, the compounds of the invention attract predominantly the males. This, of course, is no detriment as reduction of the male population will effect the entire population.

The invention is further demonstrated by the following illustrative examples:

EXAMPLE I (A) Isolation of attractant from beetles

The natural attractant was isolated as described below. Progress of the isolation was monitored by testing for attractant activity using the technique described in Example III.

Unmated female black carpet beetles (30,000) were extracted in a Blendor with benzene (4× 300 ml.) and the benzene soluble material (9.4 g.) was distilled in a short-path still onto a condenser (cooled with Dry Ice) at 100°/0.01 mm. A solution of the distillate (3.8 g.) in 100 ml. of diethyl ether was extracted with ice-cold 0.1 N sodium hydroxide solution (2× 100 ml.) which, after acidification to pH 1.5 with 1 N hydrochloric acid, was extracted with 200 ml. of diethyl ether. The acidic fraction thus obtained (1.7 g.) was chromatographed on silica gel (Gallard Schlesinger, 90–200 mesh, 175 g. in a 3.5 x 30 cm. water-cooled column) using successively 400 ml. of benzene, 800 ml. of diethyl ether, 325 ml. of acetone, and 600 ml. of methanol. The active ether fraction (0.8 g. from 17,000 female beetles) was chromatographed on an ion exchange column (AG1–X4, chloride form, 200–400 mesh, Bio-Rad Lab., 4.6 x 28 cm. column) using successively 500 ml. of methanol:water (3:1), 550 ml. of 0.1 M sodium chloride in methanol:water (3:1), and 300 ml. saturated sodium chloride in methanol:water (3:1). The active component (0.6 g.), which eluted in the first fraction, did not survive gas chromatography. It was therefore treated (esterified) in diethyl ether with diazomethane, and the product was evaporatively distilled at 100°/0.01 mm. Activity in subsequent steps was monitored on samples that were hydrolyzed to the carboxylic acid. The distillate (0.3 g. of a mixture of methyl esters from 8000 females) was fractionated by gas chromatography (5% SE 30 on Gas Pack F, 1 m. by 4 mm. inside diameter glass tubing, 150° to 200° at 2°/min., 100 cm.$^3$ He/min., 0.03 ml. of a 50% pentane solution per on-column injection); the active fraction was collected at 5–13 min. during which time the He flow was reduced to 50 cm.$^3$/min. The active fraction was rechromatographed on the same column at 150°, 53 cm.$^3$ He/min. (0.01 mol. of a 25% pentane solution per injection), and the active material that eluted at 10–22 min. was fractionated on a Carbowax 20 M column (4% on Chromosorb G, 2 m. by 4 mm. inside diameter glass tubing, 160°, 51 cm.$^3$ He/min., 0.01 ml. of a 20% pentane solution per injection). The active fraction (4 mg. of the methyl ester from 8000 beetles) that eluted at 24–30 min. gave a single symmetrical peak on four analytical 2 mm. by 2 mm. inside diameter glass columns (SE 30, Carbowax 20 M, DEGS, and TCEP).

Saponification of the methyl ester for bioassay was accomplished with a 1 N potassium hydroxide solution in 90% methanol for two hours at room temperature.

The mass spectrum of the methyl ester of the active compound showed the following diagnostic peaks, m./e.: 238 (P), 207 (P minus —OCH₃), 206 (P minus CH₃OH), 179 (P minus COOH₃), 74 (CH₂COOCH₃+H). On a double focusing mass spectrometer, the molecular weight was 238.1908 (calcd. for $C_{15}H_{26}O_2$: 238.19327). The infrared spectrum (neat) showed the following diagnostic peaks ($\mu$): 3.33 (C=CH), 5.74 (C=O), 6.03, 6.18 (weak, C=C conj.), 8.00, 8.35, 8.60 (C—O, methyl ester), 9.85, 10.18, 10.54 characteristic pattern for cis-trans conjugated double bonds, the 9.85 bond being weak), 13.90 (weak CH₂ rock). The ultraviolet spectrum (pentane) was: 232 m$\mu$, $\epsilon$=~20,000. The nuclear magnetic resonance spectrum (CCl₄, $\tau$) was: 3.55–4.90 (4 conjugated olefinic protons, 6.41 (3 protons, singlet, COOCH₃), 6.98 (2 protons, doublet, J=7 cps., C=CHCH₂COOCH₃), 7.88 (2 protons, distorted quartet, CH₂CH₂CH=), 8.72 ((CH)), 9.11 (3 protons; distorted triplet, CH₃CH₂).

From these spectra, we could identify the compound as one of the two possible cis, trans isomers of methyl 3,5-n-tetradecadienoate:

CH₃—(CH₂)₇CH=CH—CH=CH—CH₂—COOCH₃

(B) Synthesis of the cis-trans isomers

Both of the possible cis, trans isomers were synthesized. Methyl trans-3,cis-5-tetradecadienoate was synthesized from 1-decyne by the procedure reported for the synthesis of methyl trans-3,cis-5-tridecadienoate (Celmer and Solomons, Jour. Amer. Chem. Soc., vol. 75, pp. 3430, 1953).

The cis-3, trans-5 isomer was synthesized by the following sequence:

(a) Nonanol was reacted with propargyl bromide in the presence of zinc:

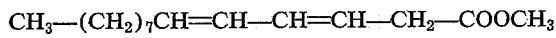

(b) The product from step (a) was reacted with tosyl chloride and the resulting ester was hydrolyzed with aqueous base:

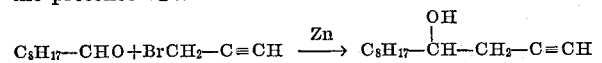

The cis and trans forms of the product were separated by gas chromatography.

(c) The trans form from step (b) was reacted with methyl magnesium bromide to form the Grignard derivative and this was reacted with ethylene oxide.

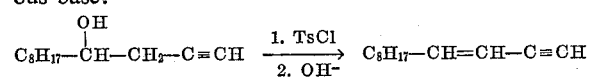

(d) The product from step (c) was oxidized to a carboxylic acid with CrO₃/H₂O₄; the carboxylic acid was methylated with diazomethane; and the methyl ester reduced with hydrogen by the Lindlar technique

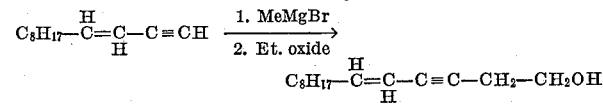

(C) Comparison of natural and synthesized compounds

The infrared and NMR spectra of the synthesized trans-3, cis-5 isomer were congruent with those of the isolated compound; the retention times on Carbowax 20 M were identical. The infrared and NMR spectra of the synthesized cis-3, trans-5 isomer showed significant differences. Thus, the structure of the attractant is:

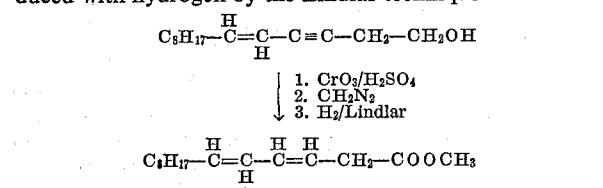

trans-3, cis-5-tetradecadienoic acid

The response of male beetles to the carboxylic acid obtained by saponification of the synthetic and the isolated trans-3,cis-5-methyl ester was identical.

EXAMPLE II

The effectiveness of trans-3,cis-5-tetradecadienoic acid as an attractant for the male black carpet beetle was determined in comparative laboratory tests using traps baited with the compound.

The trap consists of a 18 x 18 x 1.5 cm. piece of Styrofoam with a 9 cm. hole in the center within which is located the bottom of a 9 cm. plastic petri dish. The Styrofoam is tapered on the upper surface in order to provide a sloping surface for the insects to crawl on. A piece of 9 cm. filter paper impregnated with the attractant is placed on the bottom of the plastic dish and another 9 cm. plastic petri dish bottom with 4 holes on the side is inverted over the dish and fastened by tape. The insects crawl up the Styrofoam and enter the trap through the holes in the upper dish and fall into the lower dish. The insects are unable to crawl out of the trap. The insects are weak fliers and it is difficult for them to fly out of the trap.

In carrying out the tests the attractant in a benzene solvent is placed on filter paper and following solvent evaporation the filter paper is placed in the trap. The trap is exposed to male black carpet beetles within 22 by 28 inch trays. The potency of the attractant is determined by comparing the catch of the attractant with that obtained in an identical trap with a filer paper control that had been treated with benzene solvent only. The effectiveness of the attractant is illustrated in Table 1, below:

TABLE 1

[Response of *Attagenus Megatoma* males to trans-3, cis-5-tetradecadienoic acid contained in traps within a 22 x 26 inch tray]

| Attractant | Average number trapped (3 replicates, each with 50 8-9 day-old males) after— | | | | | |
|---|---|---|---|---|---|---|
| | 5 min. | 15 min. | 30 min. | 1 hr. | 2 hrs. | 18 hrs. |
| .01 mg. trans-3, cis-5-tetradecadienoic acid [1] | 7.7 | 14.3 | 21.3 | 29.3 | 34.3 | 39.3 |
| Control | .3 | .3 | 1.0 | 1.0 | 1.0 | 1.6 |

[1] Equivalent to 20 females.

EXAMPLE III

The effectiveness of the geometric isomers was tested in small vial (5-dram) olfactometers. In carrying out the tests a small quantity of the attractant compound and the various geometric isomers were placed on 12.7 mm. paper discs and suspended on the end of a glass rod over the test insects within the 5-dram vial. The number of insects that responded to the discs was determined. Table 2 shows the results obtained in these tests.

TABLE 2

[Response of *Attagenus Megatoma* males to trans-3, cis-5-tetradecadienoic acid and various other geometric isomers thereof in a 5-dram olfactometer]

| Isomer | Percentage response of the males after a 10-minute exposure to the following concentrations | | |
|---|---|---|---|
| | 10⁻⁸ gm. | 10⁻⁹ gm. | 10⁻¹⁰ gm. |
| Trans-3, cis-5 | 100 | 84 | 15 |
| Cis-3, cis-5 | [1] 100 | [1] 31 | 0 |
| Cis-3, trans-5 | [1] 31 | [1] 6 | 0 |
| Trans-3, trans-5 | [1] 19 | 0 | 0 |

[1] Due to a certain amount of isomerization the response here may not be completely due to the isomer indicated but rather to the active trans-3, cis-5 isomer.

Having thus described the invention, what is claimed is:

1. A mehod of detecting and controlling infestations of black carpet beetles which comprises baiting a trap with trans-3,cis-5-tetradecadienoic acid as an attractant.

2. The method of claim 1 wherein the attractant is impregnated on an absorbent material.

3. A method for attracting male carpet beetles which comprises subjecting such insects to the action of an effective amount of trans-3,cis-5-tetradecadienoic acid.

References Cited

UNITED STATES PATENTS 3,018,219  1/1962  Jacobson _____ 167—48
3,072,526  1/1963  Butenandt et al. _____ 167—48

OTHER REFERENCES

Walter D. Celmer and I. A. Solomons: Mycomycin. IV Stereoisomeric 3,5-diene Fatty Acid Esters, Jour. Amer. Chem. Soc., vol. 75, pp. 3430–3435, 1953.

ALBERT T. MEYERS, Primary Examiner

ALLEN J. ROBINSON, Assistant Examiner

U.S. Cl. X.R.

260—413; 424—318